United States Patent
Meier-Burkamp

[11] Patent Number: 5,896,969
[45] Date of Patent: Apr. 27, 1999

[54] SWITCHABLE RATCHET FREEWHEEL FOR MULTIPLE-GEAR HUBS FOR BICYCLES

[75] Inventor: Gerhard Meier-Burkamp, Bergrheinfeld, Germany

[73] Assignee: Fichtel & Sachs AG, Schweinfurt, Germany

[21] Appl. No.: 08/848,965

[22] Filed: May 2, 1997

[30] Foreign Application Priority Data

May 3, 1996 [DE] Germany .......................... 196 17 733

[51] Int. Cl.⁶ .................................................. F16D 41/26
[52] U.S. Cl. ................................. 192/64; 192/46; 192/47
[58] Field of Search .............................. 192/6 A, 46, 47, 192/64; 475/297

[56] References Cited

U.S. PATENT DOCUMENTS

| | | | |
|---|---|---|---|
| 3,366,206 | 1/1968 | Shimano | 192/6 A |
| 3,670,856 | 6/1972 | Segawa | 192/6 A |
| 3,973,451 | 8/1976 | Kine . | |
| 4,276,973 | 7/1981 | Fukui | 192/47 |
| 4,628,769 | 12/1986 | Nagano | 475/297 |
| 4,973,297 | 11/1990 | Bergles | 192/6 A X |

FOREIGN PATENT DOCUMENTS

| | | |
|---|---|---|
| 0531608 | 3/1993 | European Pat. Off. . |
| 0658475 | 6/1995 | European Pat. Off. . |
| 2937126 | 4/1980 | Germany . |
| 4402344 | 3/1995 | Germany . |
| 4415266 | 8/1995 | Germany . |
| 2270129 | 3/1994 | United Kingdom . |

*Primary Examiner*—Richard M. Lorence
*Attorney, Agent, or Firm*—Nils H. Ljungman & Associates

[57] ABSTRACT

A switchable ratchet freewheel, under load, for multiple-gear hubs on bicycles includes a bolted pawl, a drive, a switch bush, as well as a switch ring. The switch ring, which has a positive-fit connection to the pawl, can either be lifted by a bulge on the switch bush, which acts in concert with an incline on a switch nose, provided that a small or no turning moment is conveyed, or by recesses with end faces and timing edges, which act in concert with a run-up incline on the recesses, whereby the recess enters into a short positive-fit connection with the segment of the switch nose that faces radially inward, provided that higher turning moments are present. In case the pawl is not lifted immediately, by means of the bulge acting in concert with the incline, this results in the positive fit of the recess with the switch nose, which reliably disengages the pawl bond when the run-up incline acts in concert with the timing edge.

20 Claims, 4 Drawing Sheets

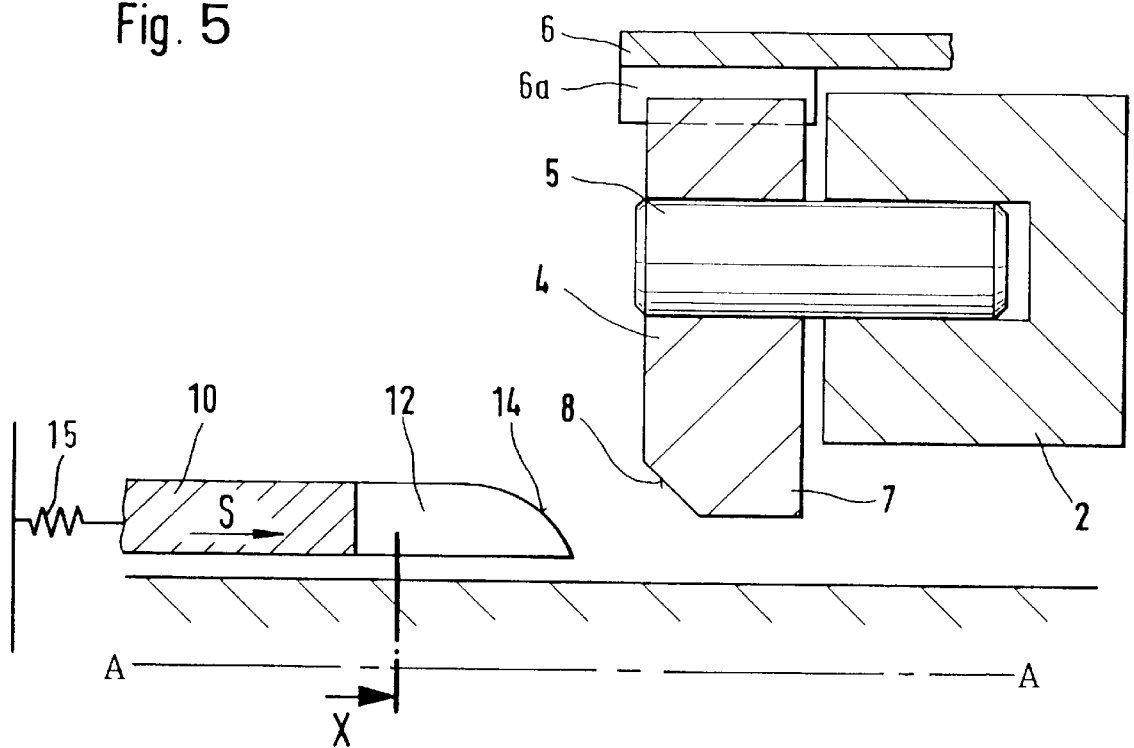

SWITCHABLE RATCHET FREEWHEEL FOR MULTIPLE-GEAR HUBS FOR BICYCLES

BACKGROUND OF THE INVENTION

1. Field of the Invention

The present invention relates generally to a switchable ratchet freewheel for multiple-gear hubs for bicycles, including at least one pawl at the end face of a drive. The pawl is pivoted on a bolt that runs parallel to the hub axis. The switchable ratchet freewheel also includes a switch ring with pawl pockets for accommodating a catch nose of the pawl and a switch bush that is movable to and fro in the direction of engagement, which switch bush can have a make-and-break contact with a switch nose that is formed on the pawl.

2. Background Information

With German Laid Open Patent Application No. 29 37 126 a control mechanism for a catch pawl with a switch hub for a bicycle is described. A pawl control link that can be slid against a catch pawl in the axial direction is shown, whereby the catch pawl shows an incline. The pawl control link is, by means of an actuating link, axially movable but placed so that it is safe against rotation. A slanted incline on the pawl control link, matching the incline of the pawl, is equipped with pockets which allow the actuating link to move the pawl control link, at certain sections, a little further in the direction of the catch pawl. The transitions of the pockets in the pawl control link shall cause the transition of the catch pawl from the catch position to the rest position to be faster and speedier. A modulating force can be generated for the catch pawl, corresponding to the incline of the pocket vis-a-vis the incline of the catch pawl. However, should the catch force be even higher with an engaged catch pawl, the pawl control link and with it the actuating link are rejected and moved back opposite the control direction. In order to avoid such motion, the present invention has created the possibility that a switch bush, corresponding to the pawl control link, can no longer move axially against a pawl but rather under the pawl with a timing edge. Such an arrangement ensures that the pawl, by means of recesses and timing edges, can also be lifted when a drive load exists that is considerably higher than the control force of the switch bush.

Furthermore, with German Patent No. 44 15 266.3 A1, which corresponds to U.S. Pat. No. 5,556,354, a switching device for change-speed gears in multiple-gear hubs for bicycles is disclosed which includes several coaxially lined-up switching levels. Switch cam rods that are placed on the surface of the hub axis, coaxially to same, become swivelable around their axis by means of a cam control. Pawl couplings that are placed on a larger diameter in the change-speed gear of the hub can simultaneously, and in a coordinated manner, be controlled by the afore-mentioned cam control of the sun wheel. Such a switch clutch is realized with a switch sheath that is movable in the axial direction. The switch sheath shows an incline that can be slid under the pawls of the pawl coupling in order to lift them. The switch sheath shows an incline which moves a bolted pawl outward by lifting the part of the pawl that points radially inward, and thus disengages the pawl bond with a switch ring that is placed outside. A switch sheath with recesses, which slides under the pawl over the entire pawl width, is not suggested.

OBJECT OF THE INVENTION

The object of the present invention is to create a switchable ratchet freewheel for multiple-gear hubs which is able to lift a pawl even when the pawl is under a high drive load, whereby in all cases, movement of a switch bush, supported by a spring, under the pawl to be lifted is ensured.

SUMMARY OF THE INVENTION

The present invention teaches that this object can be accomplished in accordance with at least one possible embodiment, by an arrangement in which a switchable ratchet freewheel for multiple-gear hubs for bicycles can include at least one pawl at the end face of a drive. The pawl can be pivoted on a bolt that runs parallel to the hub axis. The switchable ratchet freewheel can also include a switch ring with pawl pockets for accommodating a catch nose of the pawl and a switch bush that is movable to and fro in the direction of the engagement. The switch bush can have a make-and-break contact with a switch nose that is formed on the pawl. The switch nose can have an incline. The switch bush can have on the front, facing the pawl, a circumferential bulge and at least one recess. The recess can extend, in the circumferential direction, the width of the switch nose plus sufficient play for movement, in case the pawl engages with its catch nose in the pawl pockets.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below, with reference to the embodiments illustrated in the accompanying drawings, wherein:

FIG. 5 shows additional features of the switchable ratchet freewheel of FIG. 2.

DESCRIPTION OF THE PREFERRED EMBODIMENT

Figure 1:
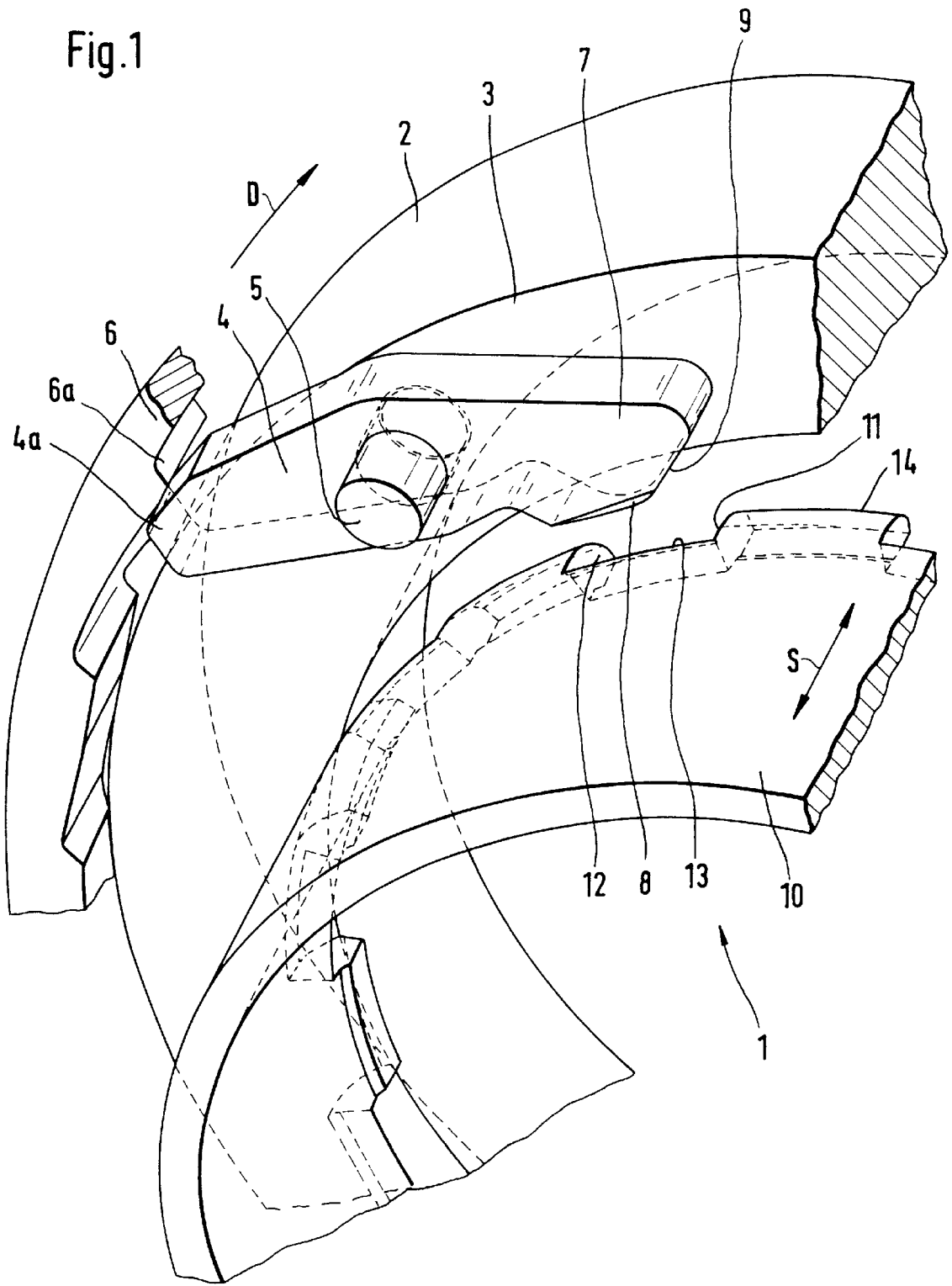
FIG. 1 shows a switchable ratchet freewheel with a switch ring, a pawl on a drive, as well as a switch bush, in a perspective illustration.

A switchable ratchet freewheel 1 for multiple-gear hubs for bicycles, can include a drive 2 and a pawl 4 that is placed in a rotatable manner on the end face 3 of the drive 2. The pawl 4 can be sprung clockwise by means of a pawl spring 51 (see FIG. 4). The switchable ratchet freewheel 1 may also include a switch ring 6 and a switch bush 10. The pawl 4 can be pivoted on a bolt 5. The axis of the bolt 5 can run parallel to the hub axis A—A (see FIG. 5). The pawl 4 is preferably able to engage, with a catch nose 4a, in the pawl pockets 6a of the switch ring 6. The pawl 4 can achieve a positive-fit catch when the switch ring 6 is twisted, vis-a-vis the drive 2, in the direction of rotation D. The pawl 4 can have a switch nose 7 on the end opposite the catch nose 4a. The switch nose 7 can have an incline 8 on a side that faces radially inward toward the hub axis A—A and a run-up incline 9 in the circumferential direction.

In other words and in accordance with one possible embodiment of the present invention, the pawl 4 can have a catch nose 4a on one end of the pawl 4. The catch nose 4a can be designed to slide into and make positive contact with the pawl pocket 6a of the switch ring 6. The catch nose 4a can make positive contact with the pawl pocket 6a when the switch ring 6 is rotated relative to the drive 2 in the direction of rotation D.

The switch bush or bushing 10 is preferably movable in the direction of rotation D in a fixed manner and in the direction of the engagement S in the axial direction. The circumferential edge of the switch bush 10, facing the pawl 4, can have a bulge or projection 14. The projection 14 can act in concert with the incline 8, provided the switch bush 10 is moved against the pawl 4. The circumferential edge with the bulge or projection 14 can have recesses 13 with a depth approximately equal to the width of the pawl 4, whereby two end faces 12 with timing edges 11 are designed. The two end faces 12 have a clearance from each other which is greater than the segment of the switch nose 7 with the incline 8 that points radially inward. In a certain position, the switch sheath or bush 10 can be slid past the pawl 4 without touching the pawl 4.

In other words and in accordance with one possible embodiment of the present invention, the switch bush or sheath 10 can be rotated around the hub axis A—A, preferably with a limited angular displacement. The circumferential edge of the switch sheath or bush 10 facing the pawl 4 can have a series of projections 14. The series of projections 14 can be separated from each other by recesses 13. Sidewalls of the projections 14 can form end faces 12 of the recesses 13. The end faces 12 can then have timing edges 11. The end faces 12 can preferably be placed apart from each other at a distance that is greater than the length of the incline 8 on the switch nose 7. The spacing of the end faces 12 can allow the switch bushing or bush 10 to move beyond the incline 8 of the pawl 4, if the incline 8 is centered in the recess 13.

Thus, the segment of the switch nose 7 with the incline 8 that points radially inward can dive into the recess 13 when the catch nose 4a is engaged with the pawl pockets 6a of the switch ring 6. It is advantageous to have the two end faces 12 of the recess 13 far apart from each other so that sufficient play is realized upon the pawl 4 diving into the recess 13. Sufficient play is preferable in order to provide enough time during operation, namely when the drive 2 with the pawl 4 rotates past the switch sheath or bush 10, for the switch sheath or bush 10 to engage. The switch bush or bushing 10 can be moved by means of the preload of a compression spring 15 (see FIG. 5).

Figure 2:
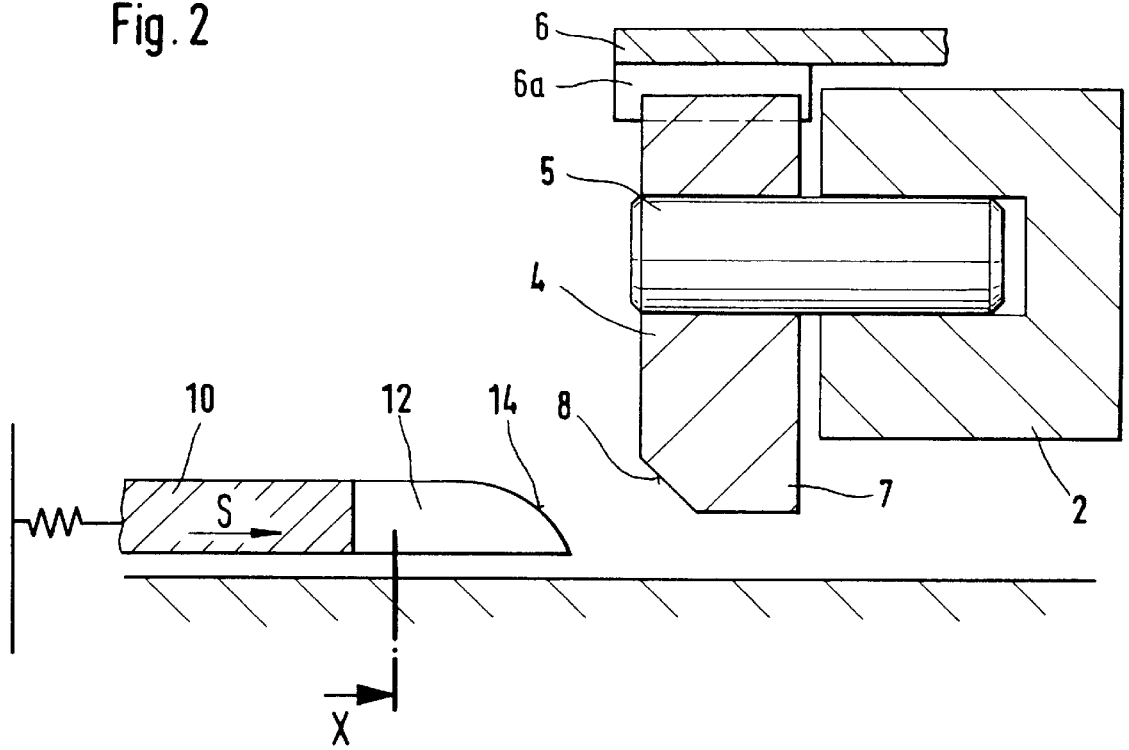
FIG. 2 shows the switchable ratchet freewheel, in a coaxial view.

As shown in FIG. 2, by moving the switch sheath 10 in the direction of the engagement S, the bulge or projection 14 can be connected to the incline 8. As a result of the projection 14 connecting to the incline 8, a power component emerges that can be active in a radially outward manner. The power component can pull the catch nose 4a, pursuant to the principle of a see-saw, out of the pawl pockets 6a of the switch ring 6. A movement based on this principle can work essentially with unloading the entire drive system of the multiple-gear hub or with only small turning moments being conveyed.

Figure 3:
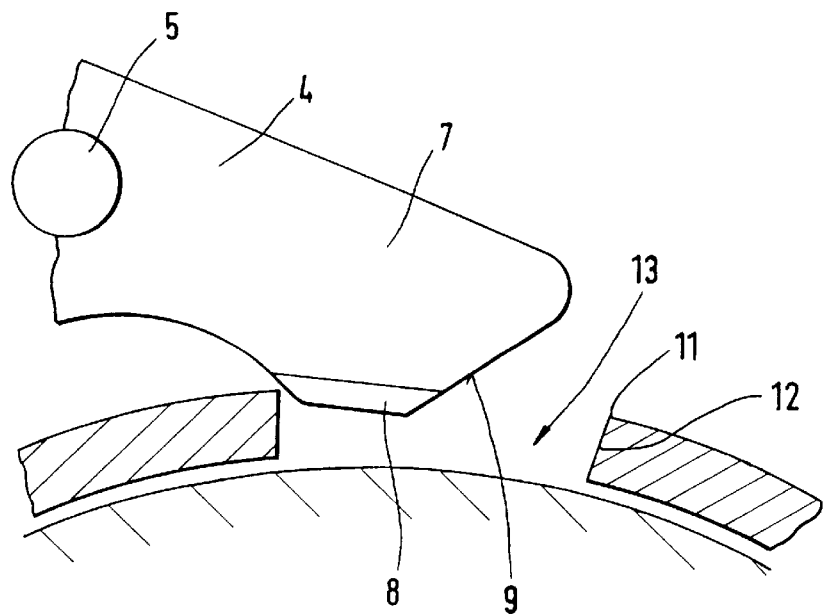
FIG. 3 shows the switch bush with recesses and timing edges, acting in concert with the pawl, in a sectional view, at an angle to the axis.

In the case of higher turning moments, the switch bush 10 can remain in this position upon its bulge or projection 14 touching the incline 8 of the pawl 4 until a recess 13 of the switch bush 10 is preferably guided past the incline 8 of the pawl 4. In the position of the switch sheath 10 vis-a-vis the pawl 4 and its incline 8 pursuant to FIG. 3, the switch sheath 10 can be moved in the direction of engagement S past the switch nose 7 that faces radially inward. As a result of the switch sheath 10 moving past the switch nose 7, a positive fit of the two components emerges. If the pawl 4 rotates further in the direction of rotation D, the run-up incline 9 can touch the timing edge 11 and is rejected on the run-up incline 9, with the result that the switch nose 7 is preferably slid radially outward. This motion takes place despite a load that is put on at this moment, as a result of which a switch motion is forced, necessary for engaging the desired gear. If the switch sheath 10, pursuant to FIG. 2, is slid so far under the pawl 4 that the recess 13 has moved past the incline 8 of the pawl 4, the catch nose 4a of the pawl 4 remains constantly beyond engaging with the pawl pockets 6a of the switch ring 6.

In other words and in accordance with one possible embodiment of the present invention, the projection 14 of the switch bush or bushing 10 can be brought into contact with the incline 8 of the switch nose 7 by moving the switch bush 10 in the direction of engagement S. The projection 14, when brought into contact with the incline 8, can raise the switch nose 7 and in turn disengage the catch nose 4a from the pawl pockets 6a based on lever principles. The projection 14 can raise the switch nose 7 when there is little or no torque being applied to the switch ring 6. When larger torques are applied to the switch ring 6, the projection 14 can still be brought into contact with the incline 8. However, the projection 14 cannot raise the switch nose 7. The projection 14 can preferably stay in contact with the incline 8 until the switch nose 7 rotates past the projection 14 and enters the recess 13. The run-up incline 9 of the switch nose 7 can then come into contact with the timing edge 11 of the end face 12, if the switch nose 7 continues to rotate in the direction of rotation D. The run-up incline 9 can slide along the timing edge 11 as the switch nose 7 continues to rotate. The sliding of the run-up incline 9 along the timing edge 11 can raise the switch nose 7 out of the recess 13 and disengage the catch nose 4a from the pawl pocket 6a. The present invention preferably forces the disengagement of the catch nose 4a from the pawl pockets 6a to allow the hub shift transmission 52 (see FIG. 4) to change gears.

The afore-described system of a switchable ratchet freewheel 1 can have the advantage of being placed on larger diameters with shorter extensions in the radial direction.

In another possible embodiment of the present invention, the bulge or projection 14 can preferably have a substantially curved surface as shown in FIG. 2. The curved surface of the projection 14 can be designed to curve outwardly or in a substantially convex manner. Alternatively, the projection 14 could have an inclined surface that is designed to match the incline 8 of the switch nose 7. In either case, the projection 14 should preferably be designed to allow the projection 14 to slide underneath the incline 8 of the switch nose 7.

In a further possible embodiment of the present invention, a plurality of pawls 4 could be disposed about the end face 3 of the drive 2. Each of the pawls 4 can have a catch nose 4a that would be able to engage with a pawl pocket 6a of the switch ring 6. The use of a plurality of pawls 4 can allow for a more effective transfer of torque from the switch ring 6 to the drive 2. The switch sheath 10 can be designed to have a plurality of projections 14 and recesses 13 in order to effectively disengage all the catch noses 4a from the pawl pockets 6a at substantially the same time.

Figure 4:
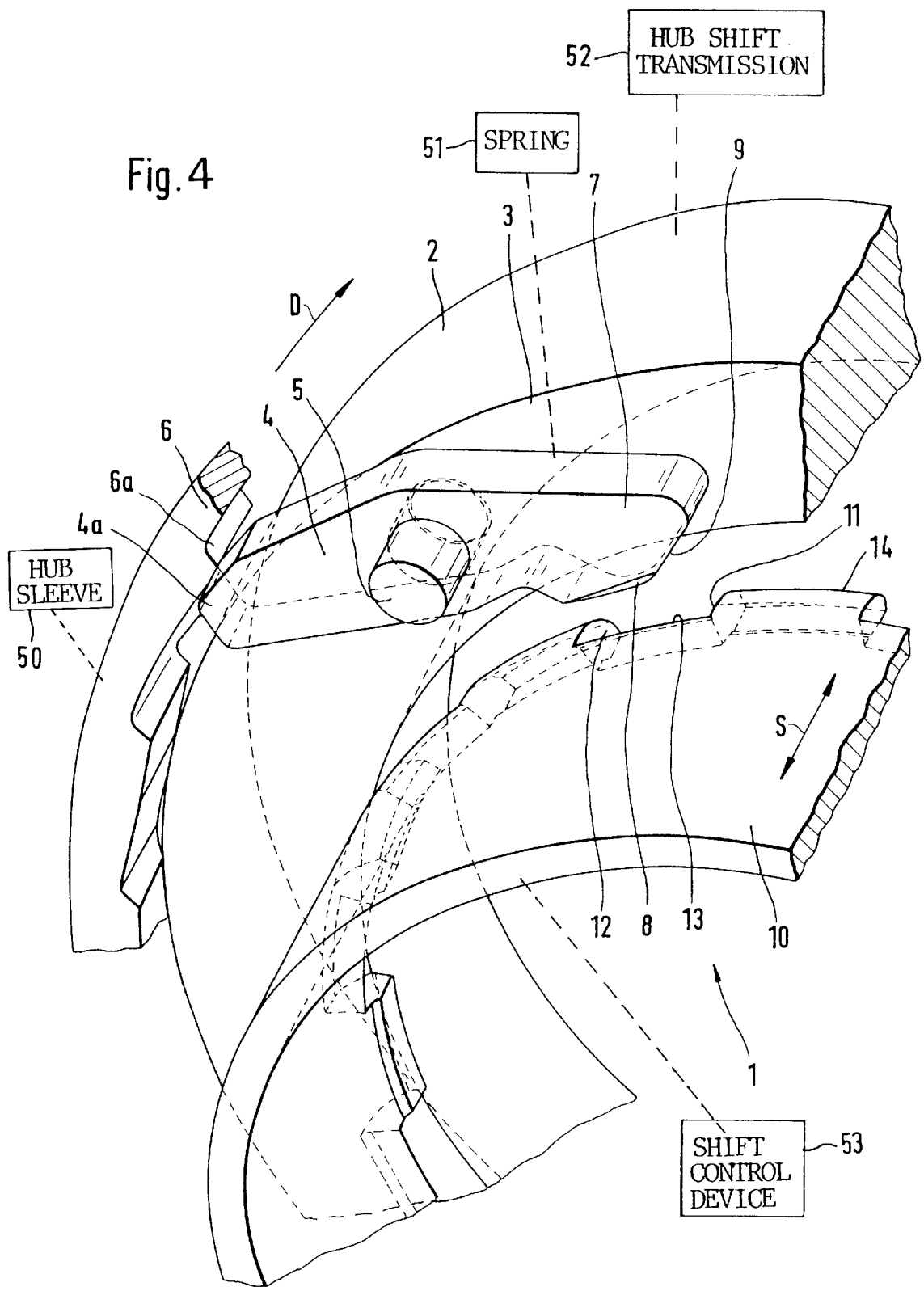
FIG. 4 shows additional features of the switchable ratchet freewheel of FIG. 1.

In still another possible embodiment of the present invention, as shown in FIG. 4, the switch ring 6 can be operatively connected to a hub sleeve 50 of a multiple-gear hub of a bicycle. The switch ring 6 can then receive torque from the hub sleeve 50 and can transfer that torque to the drive 2 when the hub sleeve 50 and switch ring 6 are moving in the direction of rotation D. When the hub sleeve 50 and the switch ring 6 are turned in a direction opposite to the direction of rotation D, no torque can be transmitted to the drive 2 and the switch ring 6 is preferably allowed to freewheel. The drive 2 can be operatively connected to a hub shift transmission 52. The hub shift transmission 52 can preferably be used to receive torque from the drive 2 and transfer that torque to an axle of a bicycle through different gear ratios. A shift control device 53 can be used to extend and retract the switch bush 10. The switch control device 53 can extend the switch bush 10 to disengage the catch nose 4a from the pawl pockets 6a. The switch control device 53 could also be used to rotate said switch bush 10 for a limited displacement. The disengagement of the catch nose 4a from the pawl pockets 6a preferably allows the hub shift transmission 52 to change gear ratios. The switch control device 53 can then retract the switch bush 10 at the completion of a gear change of the hub shift transmission 52 so the catch nose 4a can once again engage with the pawl pockets 6a to effectively transmit torque to the hub shift transmission 52.

In yet another possible embodiment of the present invention not shown here, the switch ring 6 could be operatively connected to the hub shift transmission 52. The drive 2 could then be operatively connected to an axle of a bicycle. The engagement of the catch nose 4a with the pawl pocket 6a can preferably transfer torque between the hub shift transmission 52 and the axle of the bicycle. The shift control device 53 can still be connected to the switch bush 10 to disengage the catch nose 4a from the pawl pocket 6a in order to effect a gear change in the hub shift transmission 52.

One feature of the invention resides broadly in the switchable ratchet freewheel 1 for multiple-gear hubs for bicycles, comprising at least one pawl 4 at the end face 3 of a drive 2, which pawl is pivoted on a bolt 5 that runs parallel to the hub axis, as well as a switch ring 6 with pawl pockets 6a for accommodating a catch nose 4a of the pawl 4, and finally a switch bush 10 that is movable to and fro in the direction of the engagement S, which switch bush can have a make-and-break contact with a switch nose 7 that is formed on the pawl 4 and has an incline 8, distinguished in that the switch bush 10 shows on the front, facing the pawl 4, a circumferential bulge 14 and at least one recess 13 which extends, in the circumferential direction, the width of the switch nose 7, plus sufficient play for movement, in case the pawl 4 engages with its catch nose 4a in the pawl pockets 6a.

Another feature of the invention resides broadly in the switchable ratchet freewheel distinguished in that the recess 13 shows a depth of approximately the width of the pawl 4.

Yet another feature of the invention resides broadly in the switchable ratchet freewheel distinguished in that the pawl 4 shows, in the area of the switch nose 7, a run-up incline 9 that acts in concert with a timing edge 11 which constitutes the boundary of the two end faces 12 of the recess 13.

Still another feature of the invention resides broadly in the switchable ratchet freewheel distinguished in that the switch bush 10 can be preloaded by means of a spring 15 in the direction of the engagement S.

Types of transmissions for bicycles, and components thereof, which may be utilized in accordance with the embodiments of the present invention may be disclosed in the following U.S. patents: U.S. Pat. No. 3,944,253 to Ripley on Mar. 16, 1976, entitled "Infinitely Variable Transmission for Pedal-Driven Vehicles"; U.S. Pat. No. 4,973,297 to Bergles on Nov. 27, 1990, entitled "Multispeed Drive Hub With More Than Three Speeds"; U.S. Pat. No. 4,721,015 to Hartmann on Jan. 26, 1988, entitled "Three Stage Planetary Driving Wheel for Pedal Powered Vehicles"; U.S. Pat. No. 4,063,469 to Bergles on Dec. 20, 1977, entitled "Multiple Speed Hub for a Vehicle Wheel"; U.S. Pat. No. 4,727,965 to Zach et al.; U.S. Pat. No. 4,721,013 to Steuer et al.; U.S. Pat. No. 4,651,853 to Bergles et al.; U.S. Pat. No. 4,628,769 to Nagano; U.S. Pat. No. 4,400,999 to Steuer; and U.S. Pat. No. 5,273,500.

Examples of multi-speed hubs for bicycles which may possibly be utilized or adapted for use in the context of the present invention may be disclosed in the following patents: U.S. Pat. No. 5,556,354, entitled "Shifting Arrangement for a Change Gear Drive in Multispeed Hubs for Bicycles"; U.S. Pat. No. 5,540,456, entitled "Multispeed Hub for a Bicycle"; U.S. Pat. No. 5,527,230, entitled "Multi-Speed Hub for Bicycles"; and U.S. Pat. No. 5,443,279, entitled "Bicycle and Bicycle with Multispeed Wheel Hub".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 17 733.2, filed on May 3, 1996, having inventor Gerhard Meier-Burkamp, and DE-OS 196 17 733.2 and DE-PS 196 17 733.2, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention as described hereinabove in the context of the preferred embodiments is not to be taken as limited to all of the provided details thereof, since modifications and variations thereof may be made without departing from the spirit and scope of the invention.

What is claimed is:

1. A switchable ratchet freewheel for a multiple-gear hub of a bicycle, said switchable ratchet freewheel comprising:

a first member;

said first member being substantially ring-shaped;

said first member being disposed about an axis of rotation;

a second member;

said second member being substantially cylindrically shaped;

said second member being disposed about the axis of rotation;

said second member being disposed adjacent to said first member;

at least one pawl;

said at least one pawl being configured and disposed to permit transfer of torque from said first member to said second member;

said at least one pawl having a first end and a second end;

said first end of said at least one pawl being disposed adjacent to said first member;

said second end of said pawl being disposed opposite said first end;

said first member being rotatable about the axis of rotation in a first direction;

said first member being configured and disposed to engage with said first end of said at least one pawl upon rotation of said first member in said first direction;

a bush;

said bush being disposed to slide along the axis of rotation;

said bush comprising a peripheral edge;

said peripheral edge of said bush being disposed adjacent to said at least one pawl;

said peripheral edge of said bush comprising at least one recess;

said at least one recess being configured and disposed to receive said second end of said at least one pawl;

said peripheral edge of said bush being configured and disposed to eject said second end of said at least one pawl from said at least one recess subsequent to the receiving of said second end of said at least one pawl by said at least one recess to thus disengage said first end of said at least one pawl from said first member;

said bush having a radial width dimension;

said bush having an axial length dimension; and said axial length dimension being substantially greater than said radial width dimension.

2. The switchable ratchet freewheel according to claim 1 wherein:

said bush comprises a first substantially cylindrically-shaped surface area and a second substantially cylindrically-shaped surface area;

said first surface area and said second surface area are disposed substantially concentric to one another about said axis of rotation;

said first surface area is separated from said second surface area by said radial width dimension; and said first substantially cylindrically-shaped surface area and said second substantially cylindrically-shaped surface area together comprise substantially the entire surface area of said bush.

3. The switchable ratchet freewheel according to claim 2, wherein:

said at least one recess has a circumferential width dimension;

said second end of said at least one pawl has a circumferential width dimension;

said circumferential width dimension of said recess being substantially the same as said width dimension of said pawl; and said at least one recess is configured and disposed to receive said second end of said at least one pawl and to permit circumferential movement of said second end of said at least one pawl within said at least one recess.

4. The switchable ratchet freewheel according to claim 3, wherein:

said peripheral edge of said bush comprises at least one projection; and said at least one projection of said peripheral edge of said bush is disposed adjacent to said at least one recess.

5. The switchable ratchet freewheel according to claim 4, wherein:

said at least one projection of said peripheral edge of said bush comprises an extreme end;

said extreme end comprises a substantially convex surface; and said convex surface of said at least one projection is disposed to make contact with said second end of said at least one pawl.

6. The switchable ratchet freewheel according to claim 5, wherein:

said at least one pawl has a first axial width;

said at least one recess has a second axial width; and said second axial width is substantially equal to said first axial width.

7. The switchable ratchet freewheel according to claim 6, wherein:

said at least one projection comprises at least one wall portion;

said at least one wall portion is disposed to form an end of said at least one recess;

said at least one recess comprises a back portion having said circumferential width dimension;

said back portion and said end portion being disposed at an angle of about 90° to one another; and said at least one wall portion comprises an edge portion.

8. The switchable ratchet freewheel according to claim 7, wherein:

said second end of said at least one pawl comprises a first inclined surface; and said first inclined surface is configured and disposed to contact said edge portion of said at least one wall portion upon said at least one recess receiving said second end of said at least one pawl.

9. The switchable ratchet freewheel according to claim 8, wherein said first inclined surface is configured and disposed to slide along said edge portion of said at least one wall portion to eject said second end of said at least one pawl from said at least one recess.

10. The switchable ratchet freewheel according to claim 9, wherein:

said switchable ratchet freewheel comprises a spring;

said bush is operatively connected to said spring; and said spring is configured and disposed to slide said bush along the axis of rotation to bring said peripheral edge of said bush into contact with said second end of said at least one pawl, and remove said edge of said bush from contact with said second end of said at least one pawl.

11. The switchable ratchet freewheel according to claim 10, wherein:

said second end of said at least one pawl comprises a second inclined surface; and said second inclined surface is disposed to make contact with said convex surface of said at least one projection upon said spring sliding said bush toward said second end of said at least one pawl.

12. The switchable ratchet freewheel according to claim 11, wherein said convex surface of at least one projection is configured and disposed to contact said second inclined surface to raise said second end of said at least one pawl to thus disengage said first end of said at least one pawl from said first member.

13. The switchable ratchet freewheel according to claim 12, wherein said at least one recess is configured and disposed to receive said second end of said at least one pawl upon said at least one projection contacting said second inclined surface of said at least one pawl and said first end of said at least one pawl being engaged with said first member.

14. The switchable ratchet freewheel according to claim 13, wherein:

said second member comprises an end surface;

said end surface of said second member being disposed adjacent to said at least one pawl;

said switchable ratchet freewheel comprises a bolt;

said bolt is connected to said end surface of said second member;

said bolt is disposed substantially parallel to the axis of rotation; and said at least one pawl is pivotably mounted on said bolt.

15. The switchable ratchet freewheel according to claim 14, wherein:

said bush is configured and disposed to rotate about the axis of rotation for a limited displacement;

said switchable ratchet freewheel further comprises a pawl spring to bias said at least one pawl in said first direction;

said first member comprises a first surface;

said first surface of said first member is disposed adjacent to said at least one pawl;

said first member comprises a plurality of pockets;

said plurality of pockets are disposed about said first surface of said first member; and said plurality of pockets are configured and disposed to engage with said first end of said at least one pawl upon rotation of said first member in said first direction.

16. Switchable ratchet freewheel for multiple-gear hubs for bicycles, comprising: at least one pawl at an end face of a drive; the pawl is pivoted on a bolt that runs parallel to a hub axis; a switch ring with pawl pockets for accommodating a catch nose of the pawl; a switch bush that is movable to and fro in an engagement direction; the switch bush having a make-and-break contact with a switch nose that is formed on the pawl and has an incline; the switch bush comprises a front portion facing the pawl, said switch bush comprises on said front portion a circumferential edge; said circumferential edge comprising at least one rounded portion and at least one recess; and said at least one recess extends, in the circumferential direction, the circumferential width of the switch nose plus sufficient play for movement, in case the pawl engages with its catch nose in the pawl pockets; said bush having a radial width dimension; said bush having an axial length dimension; and said axial length dimension being substantially greater than said radial width dimension.

17. The switchable ratchet freewheel according to claim 16 wherein:

said bush comprises a first substantially cylindrically-shaped surface area and a second substantially cylindrically-shaped surface area;

said first surface area and said second surface area are disposed substantially concentric to one another about said hub axis;

said first surface area is separated from said second surface area by said radial width dimension;

said first substantially cylindrically-shaped surface area comprises substantially the entire outer surface area of said bush; and said second substantially cylindrically-shaped surface area comprises substantially the entire inner surface area of said bush.

18. Switchable ratchet freewheel pursuant to claim 17, wherein the at least one recess has a depth of approximately the width of the pawl.

19. Switchable ratchet freewheel according to claim 18, wherein:

the pawl comprises, in the area of the switch nose, a run-up incline that acts in concert with a timing edge which constitutes a boundary of two end faces of the at least one recess;

said at least one recess comprises a back portion disposed between said end faces; and said end faces each being disposed at an angle of about 90° to said back portion.

20. Switchable ratchet freewheel according to claim 19, wherein the switch bush is preloaded by means of a spring in the direction of the engagement.

* * * * *